United States Patent [19]

Otrhalek et al.

[11] Patent Number: 4,529,451
[45] Date of Patent: Jul. 16, 1985

[54] ZINC PHOSPHATE COATED METAL AND PROCESS OF PRODUCING SAME

[75] Inventors: Joseph V. Otrhalek, Dearborn, Mich.; Donald R. Gerard, Bowling Green, Ky.

[73] Assignee: Detrex Chemical Industries, Inc., Southfield, Mich.

[21] Appl. No.: 564,635

[22] Filed: Dec. 28, 1983

Related U.S. Application Data

[63] Continuation-in-part of Ser. No. 455,296, Jan. 3, 1983, abandoned, which is a continuation-in-part of Ser. No. 439,754, Nov. 8, 1982, abandoned.

[51] Int. Cl.³ .............................................. C23F 7/08
[52] U.S. Cl. .......................... 148/6.15 Z; 148/6.15 R; 427/57
[58] Field of Search ..................... 148/6.15 Z, 6.15 R; 427/57

[56]   References Cited
U.S. PATENT DOCUMENTS 4,353,934  10/1982  Nakashima ........................... 427/57

FOREIGN PATENT DOCUMENTS 2818160  11/1978  Fed. Rep. of Germany ..... 148/6.15 Z
2021649   5/1979  United Kingdom ........... 148/6.15 Z
 730877  12/1977  U.S.S.R. ......................... 148/6.15 Z Primary Examiner—Sam Silverberg
Attorney, Agent, or Firm—Paul & Paul

[57]   ABSTRACT

A method for forming conversion coatings on metallic surfaces using an aqueous zinc phosphate immersion bath within which there is positioned a source of ultrasonic energy and the coated metallic object produced in carrying out the process in a controlled ultrasonic power environment.

12 Claims, 23 Drawing Figures

ZINC PHOSPHATE COATED METAL AND PROCESS OF PRODUCING SAME

CROSS-REFERENCE TO OTHER APPLICATION

This is a continuation-in-part of U.S. patent application Ser. No. 455,296, filed Jan. 3, 1983 now abandoned, which is a continuation-in-part of U.S. patent application Ser. No. 439,754, filed Nov. 8, 1982 now abandoned.

BACKGROUND OF THE INVENTION

For many years it has been known that aqueous zinc phosphate coatings when applied to metallic surfaces such as steel, galvanized iron and aluminum form conversion coatings which provide corrosion resistant properties to such metallic surfaces and likewise provide a surface to which siccative coatings such as paint will adhere. However, in preparing conversion coatings for a paint application, attempts to apply such conversion coatings by immersion of the metal surfaces in a zinc phosphate bath have not been satisfactory due to the tendency under such conditions to form heavy, coarse coatings. Consequently, the art has turned to the use of spray processes to obtain finer coatings. Such spray processes have the disadvantage of a lesser penetration of crevices and inaccessible areas as compared to immersion processes but the coatings thus obtained are noticeably finer although still in need of improvement, particularly as to corrosion resistance. Another disadvantage of the processes of the art is the difficulty in coating the areas of steel surfaces upon which there lies carbon residue. Such areas of carbon residue on steel surfaces are common occurrences.

When used as a base for paint, the process of the present invention provides a fine-grained smooth, uniform and penetrating conversion coating on metallic surfaces using a zinc phosphate immersion process, thus overcoming the disadvantages inherent in the prior immersion processes and at the same time overcoming the disadvantages inherent in the prior spray processes.

In preparing zinc phosphate coatings suitable for application of rust preventive oil, attempts to apply such conversion coatings by immersion of the metal surfaces in a zinc phosphate bath have not produced optimal results due to the tendency under such conditions to form a coating which is coarse and granular and does not provide an optimal base for rust preventive oil.

The present invention provides finer crystal structure and covers the metallic surface, including crevices, more completely, thereby providing greater rust protection than previously possible. The present invention also provides the capability of covering the areas of carbon residue found on steel surfaces.

SUMMARY OF THE INVENTION

The process of the present invention consists broadly of immersing a metallic surface in a conversion coating bath while exposing such immersed metallic surface to ultrasonic energy and while controlling the ultrasonic power environment to which the metallic surface is exposed.

We have discovered that when ultrasonic energy is applied to a metallic surface immersed in an aqueous zinc phosphate coating bath within a limited energy range, coating action is accelerated, resulting in fine-grained, uniform and smooth coatings superior to conversion coatings produced either by the immersion or by the spray processes of the prior art. The energy range may be limited by varying the energy produced by the transducers or by varying the positions of the transducers and metallic surface relative to each other curvilinearly so that the metallic surface passes through zones of varying energy intensities inherent to energy produced by ultrasonic transducers. The preferred frequency range for such ultrasonic energy lies in the range from about 18 kilohertz to about 60 kilohertz. Within this range there is no apparent optimum frequency but we have operated satisfactorily at 26 kilohertz, 40 kilohertz and 60 kilohertz.

We have also discovered that relative curvilinear motion between the metallic surface and the transducer during exposure to the ultrasonic energy produced fine-grained, uniform, smooth and unstriated coatings superior to the conversion coatings produced by processes described in the prior art. The metallic surface was moved to and from the transducers in the tests by hand. In practice, the metallic surface may be moved by any of a number of mechanical means, such as the Pusher-Type Split-Rail Full Automatic plating machines sold by Occidental Metal Industries Corp., 21441 Hoover Road, Warren, Mich. 48089, the hoist method of Example XIV, or by tumbling the parts in a barrel as described in Example XIII. Under some conditions, benefits may be derived by moving the transducers with respect to the metallic surface or by placing transducers inside a metal cavity in order to coat an inside surface of a metal body. In other circumstances, it may be desirable to keep the transducers and metallic surface stationary relative to each other and to cause the metallic surface to pass through zones of varying energy intensities by varying the frequency of the ultrasonic energy.

It has also been discovered that with a high quality phosphate solution in conjunction with the application of ultrasonic power as detailed in this disclosure, areas of carbon residue inherently found on steel surfaces may be phosphate coated.

Finally, we have discovered that application of ultrasonic energy for only the first 15–30 seconds that the metallic surface is in the solution creates a plurality of nucleating sites sufficient to achieve the improved phosphate coating provided by the processes of this invention even where the phosphate coating process continues after the application of ultrasonic energy is discontinued.

DETAILED DESCRIPTION OF THE INVENTION

The process of the present invention is applicable to applying conversion coatings to surfaces of steel, steel alloys, galvanized iron, and aluminum and aluminum alloys. Specific examples involving each of these metallic surfaces are set forth below. The examples below also demonstrate that, surprisingly, optimum results are obtained with the process of this invention only within a limited range of ultrasonic power. The power must be above the point of cavitation at the metal surface, but below a point at which the beneficial effects of the ultrasonic power diminishes. Although applicant does not wish to be bound to any particular theory of operation, the applicant believes that this upper limit is the point at which power above that point provides so much energy to the metal surface that the reaction cannot take place at the surface and the product of the reaction cannot adhere to the surface.

As disclosed in the following examples, relative curvilinear motion between the metallic surface and the transducers during exposure to the ultrasonic energy produced fine-grained, uniform, smooth and unstriated coatings superior to the conversion coatings produced by processes described in the prior art. Curvilinear motion means motion which follows a curved path. Such curvilinear motion includes, but is not limited to, rotating and revolving, or any portion of a rotation or revolution. An example of partial revolution is the motion of the workpieces in the rotating drum of Example XIII. The axis of rotation or revolution may be horizontal, vertical or at any other angle. Also included in curvilinear motion is oscillating motion, such as the motion to and from the radiating surface in the first 12 examples below. Tumbling, twisting and turning is also contemplated in the definition of curvilinear motion. Sinusoidal movement is also included in the phrase curvilinear motion. Regardless of the type of curvilinear motion, an important characteristic is that at least a portion of the metallic surface, for some period of time, moves toward or away from a plane containing the radiating surface of at least one of the ultrasonic transducers during exposure of the metallic surface to the ultrasonic energy. We believe that this type of motion moves the metallic surface through zones of varying energy intensities inherent to energy produced by ultrasonic transducers, thus avoiding the above-noted coating problems such as striation.

EXAMPLE I

A rack of six 4"(W)×6"(L) steel panels was first thoroughly cleaned with an alkali cleaner and then rinsed by dipping for one minute in a warm water rinse. An aqueous zinc phosphate conversion coating solution was then prepared containing the following ingredients and the amounts indicated:

Zinc as Zn—1.7 g/l
Phosphate as $PO_4$—5.5 g/l
Nitrate as $NO_3$—2.2 g/l
Nitrite as $NO_2$—0.1 g/l
Nickel as Ni—0.2 g/l
Magnesium as Mg—0.1 g/l
Fluoborate Ion—0.4 g/l A solution of the above concentrations is prepared as follows. For each 100 gallons of solution, with the circulating pump running, add 15 fl. oz. of 50% sodium hydroxide. Allow the solution to circulate for 15 to 20 minutes and add 1½ gallons of a solution containing the above ingredients to give the concentrations listed. Allow the resultant solution to again circulate for 15 to 20 minutes and check it for Free Acid Points (FAP) and Total Acid Points (TAP). FAP and TAP are discussed below. The TAP:FAP ratio should be 10:1 to 14:1, with a TAP of 9.0 to 12.0. Two to six fl. oz. of a nitrite accelerator to give the concentration given above are added 15 to 20 minutes prior to starting production. Both the solution containing the above ingredients to give the concentrations listed and the accelerator solution should be added continuously via proportioning pumps or dripping from a container. The accelerator level should be 2 to 4 ml.

To determine the FAP, place a 10 ml. sample of the bath in a clean beaker. Add one or two drops of methyl orange indicator solution. Titrate with 0.1N sodium hydroxide until a straw-yellow color is obtained. The number of mls. of 0.1N sodium hydroxide titrated is the FAP of the bath.

To determine the TAP, place a 10 ml. sample of the bath in a clean beaker. Add three to five drops of phenolphthalein indicator solution. Titrate with 0.1N sodium hydroxide until a peak color persists throughout the solution. The amount in ml. of 0.1N sodium hydroxide titrated is the TAP of the bath.

To measure the accelerator level, place a 25 ml. sample of the bath in a clean beaker. Add 10 to 15 drops of 50% sulfuric acid to the sample. Titrate with 0.042N potassium permanganate until a purplish color persists for 20 to 30 seconds but fades out within 60 seconds. The amount in mls. of 0.042N potassium permanganate titrated is the accelerator level of the bath.

Sixty-four gallons of the above aqueous solution were put into a stainless steel container measuring 2 feet square and 2 feet deep. The top of the solution was 1 inch from the top of the container. Within such container and attached to the bottom thereof were two stainless steel containers containing 9 lead zirconate titanate transducers adapted to being connected to an external power supply. The distance from the top of the transducer containers to the top of the solution was 18 inches. Each transducer container was rated at 350 watts at full power with the power input being variable. The transducers were operated at full power for 30 minutes with the solution at 140° F. in order to degas the aqueous zinc phosphate coating solution. The power input to the transducers was then reduced to below the cavitation point and a rack containing six of the previously cleaned steel panels was lowered into the coating solution to a depth wherein the top edges of the panels were 1 inch below the top of the solution. Power input was increased to just above the cavitation point and maintained for a period of two minutes at that power level with the bath at 140° F.

The steel panels were painted and salt spray tested. These tests showed that panels produced by the process at this example were highly superior in performance to panels produced by the previous conventional procedures.

EXAMPLE II

The steps of Example I were repeated several times at progressively higher power levels until the onset of formation of an irregular, nonuniform coating was observed. The results indicated that smooth, uniform coatings were formed as the power levels were raised about 1.32 Watts/gal. of solution and 0.20 Watts/square inch radiating surface until at 7.94 Watts/gal. of solution and 1.16 Watts/sq. in. radiating surface the onset of the formation of an irregular, nonuniform coating was observed. The onset of formation of an irregular nonuniform coating is the point at which the beneficial effects of the ultrasonic energy diminishes. Thus the improved results of the present invention were obtained in this case in the range from 1.32 Watts/gal. of solution and 0.20 Watts/sq. in. radiating surface to just below 7.94 Watts/gal. of solution and 1.16 Watts/sq. in. radiating surface. The coating values obtained at the progressively higher power levels were as follows:

| Watts/gal. of Solution | Watts/sq. in. Radiating Surface | Coating Weight | Nature of Coating |
|---|---|---|---|
| 1.32 | 0.20 | 120 mg/sq. ft. | Regular, uniform |
| 1.76 | 0.26 | 170 mg/sq. ft. | Regular, uniform |
| 2.67 | 0.39 | 230 mg/sq. ft. | Regular, uniform |
| 4.41 | 0.65 | 220 mg/sq. ft. | Regular, uniform |
| 7.94 | 1.16 | 200 mg/sq. ft. | Irregular, |

-continued

| Watts/gal. of Solution | Watts/sq. in. Radiating Surface | Coating Weight | Nature of Coating |
|---|---|---|---|
| 10.29 | 1.51 | 160 mg/sq. ft. | nonuniform Irregular, nonuniform |

The steel panels were painted and salt spray tested. These tests showed that panels produced by the optimum range of the process of this example were highly superior in performance to panels produced by the previous conventional procedures.

EXAMPLE III

The process of Example I was carried out using panels made from Aluminum alloy 2024. The test procedure of Example II was then followed and the following results were obtained.

| Watts/gal. of Solution | Watts/sq. in. Radiating Surface | Coating Weight | Nature of Coating |
|---|---|---|---|
| 1.32 | 0.20 | 195 mg/sq. ft. | Smooth, uniform, fine crystals |
| 2.67 | 0.39 | 282 mg/sq. ft. | Smooth, uniform, fine crystals |
| 10.29 | 1.51 | 160 mg/sq. ft. | Irregular, nonuniform, fine crystals |

The aluminum panels were salt spray tested. These tests showed that panels produced by the optimum range of the process of this example were highly superior in performance to panels produced by the previous conventional procedures.

EXAMPLE IV

The process of Example I was carried out using galvanized iron panels in place of the steel panels of Example I. The test procedure of Example II was followed for values of no power and of 2.67 Watts/gal. of solution and 0.39 Watts/sq. in. radiating surface.

| Watts/gal. of Solution | Watts/sq. in. Radiating Surface | Nature of Coating |
|---|---|---|
| 0 | 0 | Irregular, nonuniform, coarse crystals |
| 2.67 | 0.39 | Regular, uniform, fine crystals |

The galvanized iron panels were painted and salt spray tested. These tests showed that panels produced by the process of this example were highly superior in performance to panels produced by the previous conventional procedures.

EXAMPLE V

The process of Example I was carried out using an aqueous zinc phosphate conversion coating solution containing the following ingredients in the amounts indicated:
Zinc as Zn—2.5 g/l
Phosphate as $PO_4$—6.6 g/l
Nitrate as $NO_3$—2.0 g/l
Nitrite as $NO_2$—0.1 g/l
Fluosilicic Ion—0.4 g/l
A solution of the above concentrations is prepared as follows. For each 100 gallons of solution, add to the heated (120° F.) water, with circulating pump running, the following materials in the sequence listed.
 (a) One pound of Caustic (dissolved in water).
 (b) One and one-half gallons of solution containing the above ingredients to give the concentration listed.
 (c) Six to eight fl. oz. of solution prepared by dissolving two pounds of sodium nitrite material per gallon of water.

The FAP should be 0.8 to 1.2, while the TAP should be 10 to 16 and the accelerator level one to four ml. The operating temperature of the bath should be between 120° F. and 150° F. The FAP, TAP and accelerator level were determined as in Example I.

The steel panels were painted and salt spray tested. The results of these tests were substantially the same as in Example I.

EXAMPLE VI

The process of Example I was carried out using an aqueous zinc phosphate conversion coating solution containing the following ingredients in the amounts indicated:
Zinc as Zn—1.8 g/l
Phosphate as $PO_4$—8.0 g/l
Nitrate as $NO_3$—17.0 g/l
Nitrite as $NO_2$—0.1 g/l
Nickel as Ni—0.2 g/l
Magnesium as Mg—0.3 g/l
Calcium as Ca—5.2 g/l
Fluosilicic Ion—5.0 g/l
A solution of the above concentrations is prepared as follows. For each 100 gallons of solutions, add the following material to the circulating water:
 (a) 1.2 gallons of solution containing all of the ingredients listed except calcium and nitrite.
 (b) 3 gallons of Additive solution containing ingredients to give the concentration of calcium listed.
 (c) 5 ounces of Caustic dissolved in water or 190 ml. of 50% Caustic.
 (d) 13 fl. oz. of Activator solution containing nitrite added twenty minutes prior to starting production.

The FAP should be 0.7 to 0.9, while the TAP should be 12 to 15 and the Activator 1.5 to 2.3. The operating temperature of the bath should be between 145° F. and 155° F. The FAP and TAP were determined as in Example 1.

The steel panels were painted and salt spray tested. The results of these tests were substantially the same as in Example I.

EXAMPLE VII

Three 4"(W)×12"(L) steel panels, A, B and C, were first thoroughly cleaned with an alkali cleaner and then rinsed by dipping for 30 seconds in cold water. Fifty gallons of an aqueous zinc phosphate conversion coating solution at 150° F. were prepared as described in Example I and put into a stainless steel container measuring two feet square. The top of the solution was 23 inches above two ultrasonic transducer containers of the type described in Example I. The three steel panels, A, B and C, were placed in the solution for two minutes. Steel panel A was held one inch below the surface of the solution with no ultrasonic agitation or panel movement. Steel panel B was held stationary one inch below the surface of the solution with the two ultrasonic transducer containers operating at full power. Steel panel C was placed in the solution with the two ultrasonic transducer containers operating at full power and moved up and down from one inch below the top of the solution to two inches from the bottom at a rate of 20 cycles per minute for two minutes. The steel panels were then rinsed by a 30 second dip in cold water followed by a passivating rinse. The following results were obtained:

| Test Panel | Visual Appearance | Crystal Size | Coating Weight mg/ft.$^2$ |
|---|---|---|---|
| A (No sonic energy or panel movement) | Smooth coating | Coarse | 473 |
| B (Sonic energy and no panel movement) | Irregular coating | Much finer than Panel A | 384 |
| C (Sonic energy and panel movement) | Smooth coating | Much finer than Panel A | 347 |

EXAMPLE VII

The process of Example VII was repeated except that galvanized steel panels were used instead of steel panels. The following results were obtained:

| Test Panel | Visual Appearance | Crystal Size | Coating Weight mg/ft.$^2$ |
|---|---|---|---|
| A (No sonic energy or panel movement) | Smooth coating | Coarse | 653 |
| B (Sonic energy and no panel movement) | Irregular coating | Much finer than Panel A | 726 |
| C (Sonic energy and panel movement) | Smooth coating | Much finer than Panel A | 675 |

EXAMPLE IX

The process of Example VII was repeated except that the panels were immersed for five minutes and a zinc phosphating solution suitable for producing a heavy coating which serves as a base for rust preventive oil was used. The solution contains the following ingredients in the amounts indicated:
Zinc as Zn—7.5 g/l
Phosphate as PO$_4$—19.8 g/l
Nitrate as NO$_3$—6.0 g/l A solution of the above concentration is prepared as follows. For each 100 gallons of solution, add to heated (125° F.) water, 3½ gallons of solution containing the foregoing ingredients to give the concentrations listed. The FAP should be 5 to 7, while the TAP should be 30 to 35. The operating temperature of the bath should be 185° F. to 205° F. The FAP and TAP were determined as in Example I.

The following results were obtained:

| Test Panel | Visual Appearance | Crystal Size | Coating Weight mg/ft.$^2$ |
|---|---|---|---|
| A (No sonic energy or panel movement) | Smooth Coating | Coarse | 1,176 |
| B (Sonic energy and no panel movement) | Irregular coating | Much finer than Panel A | 1,287 |
| C (Sonic energy and panel movement) | Smooth coating | Much finer than Panel A | 1,329 |

EXAMPLE X

The process of Example IX was repeated except that ten test panels, numbered 2-11, were immersed for various lengths of time, test panels 2, 3, 4 and 5 were exposed to no ultrasonic energy and the ultrasonic energy was applied to test panels 10 and 11 for a limited time and then stopped while the reaction proceeded. The following results for the various test conditions were obtained:

| Test Panel No. | Total Length of Time Immersed | Length of time Ultrasonic Energy Was Applied | Coating Weight mg/ft.$^2$ | Appearance |
|---|---|---|---|---|
| 2 | 15 sec. | 0 | 186 | Coarse coating |
| 3 | 1 min. | 0 | 853 | Coarse coating |
| 4 | 2 min. | 0 | 1,201 | Coarse coating |
| 5 | 5 min. | 0 | 1,248 | Coarse coating |
| 6 | 15 sec. | 15 sec. | 241 | Finer coating than Panel 2 |
| 7 | 1 min. | 1 min. | 958 | Finer coating than Panel 3 |
| 8 | 2 min. | 2 min. | 1,252 | Finer coating than Panel 4 |
| 9 | 5 min. | 5 min. | 1,332 | Finer coating than Panel 5 |
| 10 | 2 min. | First 15 sec. | 1,250 | Fine coating- finer than Panel 4 but coarser than Panel 8 |
| 11 | 2 min. | First 30 sec. | 1,188 | Fine coating- similar to Panel 10 |

EXAMPLE XI

Twelve 4"(W)×12"(L) steel panels were first thoroughly cleaned with an alkali cleaner and then rinsed by dipping for one minute in a warm water rinse. An aqueous zinc phosphate conversion coating solution was then prepared as in Example IX.

Sixty-four gallons of the aqueous solution were put into a stainless steel container measuring two feet square and two feet deep. Within the container and attached to the bottom thereof were two stainless steel containers containing piezoelectric type transducers generating 26.5 kilocycles per second. Each of the two containers was rated at 350 watts of full power with the power input being variable. The distance from the top of the transducer containers to the top of the solution was 18 inches. The steel panels were placed one inch below the surface of the solution at various power settings and held stationary in the solution for various length of time as shown in the table below. The steel panels were then rinsed by two one-minute dips in cold water and a passivating rinse. Next, the steel panels were oiled by a five-minute dip in rust preventive oil and salt spray tested. The results are presented in the table below:

| Watts gal. of Solution | Watts sq. in. Radiating Surface | COATING WEIGHT MG/FT² | | OILED SALT SPRAY HRS. BEFORE RUST | |
|---|---|---|---|---|---|
| | | Phos. Time: | | | |
| | | 5 Min. | 15 Min. | 5 Min. | 15 Min. |
| 0 (Control) | 0 | 2300 | 2650 | 24 | 64 |
| 0.75 | 0.11 | 2150* | 2250* | 64 | 88 |
| 1.63 | 0.24 | 2200* | 2250* | 64 | 112 |
| 2.52 | 0.37 | 1350* | 1300* | 64 | 136 |
| 4.41 | 0.65 | 1350* | 1350* | 236 | 236 |
| 8.64 | 1.27 | 1400* | 1350* | 320 | 320 |

Phos. Time is the length of time the test panel was held in solution.
*Coatings noted by * have smooth regular coating. All other coatings have lighter color, are not as smooth and have much coarser coatings. The coatings at 2.52 W/gal. and 0.37 W/sq. in., 4.41 W/gal. and 0.65 W/sq. in., and 8.64 W/gal. and 1.27 W/sq. in. have particularly fine crystal size.

EXAMPLE XII

The process of Example XI was followed except that the solution contained the following ingredients in the amounts indicated:

Zinc as Zn—7.2 g/l
Phosphate as $PO_4$—19.1 g/l
Nitrate as $NO_3$—5.7 g/l
Cobalt as CO—0.03 g/l A solution of the above concentrations is prepared as follows. For each 100 gallons of solution, add to heated (120° F.) water, 4 gallons of solution containing the foregoing ingredients to give the concentrations listed. The FAP should be 5 to 7, while the TAP should be 30 to 35. The operating temperature of the bath should be 185° F. to 205° F. The FAP and TAP were determined as in Example I. The following results were obtained:

| Watts gal. of Solution | Watts sq. in. Radiating Surface | COATING WEIGHT MG/FT² | | OILED SALT SPRAY HRS. BEFORE RUST | |
|---|---|---|---|---|---|
| | | Phos. Time: | | | |
| | | 5 Min. | 15 Min. | 5 Min. | 15 Min. |
| 0 (Control) | 0 | 2870 | 3200 | 24 | 64 |
| 0.75 | 0.11 | 2700* | 3150* | 48 | 112 |
| 2.52 | 0.37 | 2050* | 2250* | 136 | 150 |
| 4.41 | 0.65 | 2250* | 1900* | 480 | 480 |
| 8.64 | 1.27 | 2250* | 1800* | 480 | 480 |

Phos. Time is the length of time the test panel was held in solution.
*Coatings noted by * have smooth regular coating. All other coatings have lighter color, are not as smooth and have much coarser coatings. The coatings at 2.52 W/gal. and 0.37 W/sq. in., 4.41 W/gal. and 0.65 W/sq. in., and 8.64 W/gal. and 1.27 W/sq. in. have particularly fine crystal size.

EXAMPLE XIII

FIG. 21 shows a plurality of ultrasonic transducers 51 arranged in a harness 55. Ultrasonic transducers 51 are held in place by metal sheets 52 attached to harness 55. Harness 55 with ultrasonic transducers 51 was placed in a phosphate conversion coating bath 61 as shown in FIG. 22. Harness 55 is equipped with support arms 53 which support harness 55 in conversion coating bath 61 by resting on the top edges 62 of the tank holding the conversion coating bath 61. Perforated drum 70 is supported by arms 71 connected to axle 72. Arms 71 are attached to frame 73, which may be raised or lowered by a mechanism, not shown in the figures, positioned above frame 73. Although the mechanism for raising and lowering frame 73 is not shown, any of the number of wellknown mechanisms, such as the Programat Bulk Processing Machines or the H.O.B. Programat Hoist System sold by Occidental Metal Industries Corp., mentioned above, may be used. Attached to frame 73, is a motor 74, shown in FIG. 23. Motor 74 drives gear 76 by means of gear 75. Gear 76 is securely fastened to drive shaft 77, which drives bull gear 79 by means of gear 78. Bull gear 79 is securely attached to drum 70, so that motor 74 causes drum 70 to rotate by means of the mechanism described above. Drums such as described above include Udy-Pro Gear-Driven Polypropylene Plating Barrels and Heavy-Duty Gear-Driven Tumbling Barrels by Occidental Metal Industries Corp., noted above.

Several metallic pieces were placed in drum 70. Drum 70 was lowered into frame 55 which was suspended in the conversion coating bath, as shown in FIG. 22. The perforations in drum 70 allowed the bath to flow through the drum. Motor 74 and ultrasonic transducers 51 were activated. The optimum power level of the ultrasonic transducers—a level above cavitation, but below the limit at which the beneficial effects of ultrasonic power substantially diminished—was determined in a limited number of tests.

The conversion coatings produced on the metallic surfaces by this process were superior to those produced by processes of the prior art.

EXAMPLE XIV

An automobile body may be attached to a platform which may be rotated in any of a number of ways. For example, the drum in Example XIII may be replaced with a platform positioned on the axle described in Example XIII. If desired, the bull gear may be replaced with a smaller gear and a belt that connects the smaller gear to the drive shaft. The automobile body may be lowered into a phosphate conversion coating bath and partially surrounded by ultrasonic transducers as was the drum in Example XIII. The automobile may then be revolved about the axle attached to the platform while ultrasonic energy is applied.

BRIEF DESCRIPTION OF THE DRAWINGS

The annexed FIGS. 1 to 10 consist of photolithographic reproductions of photomicrographs of various metallic surfaces formed in the practice of the present invention taken with an electron microscope at various magnifications. These figures show the conversion coating crystal formations as follows.

DETAILED DESCRIPTION OF THE DRAWINGS

Figure 1:
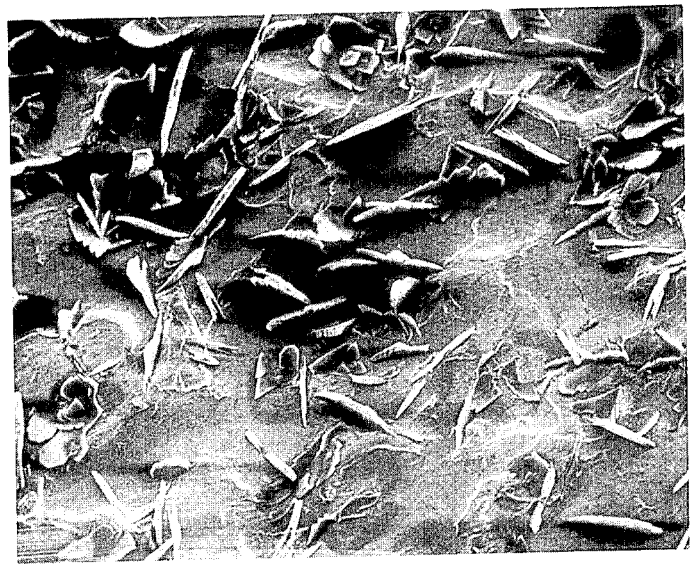
FIG. 1 is a photomicrograph of a panel from Example I with no ultrasonic power applied at magnification 375X.
Figure 2:
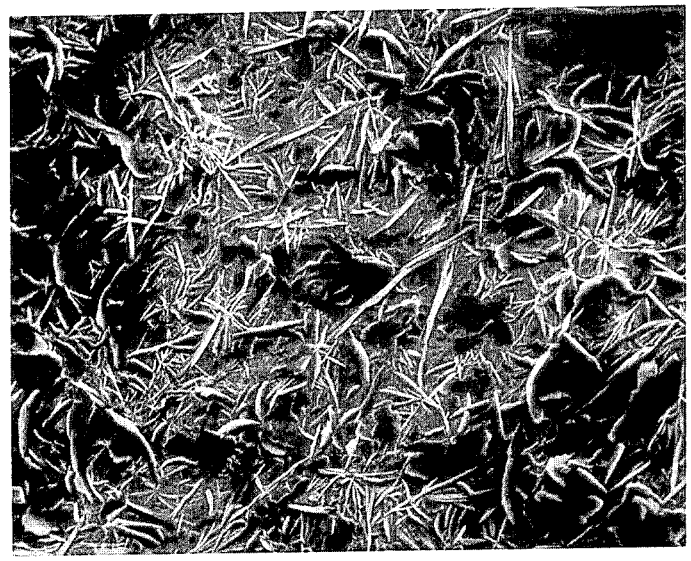
FIG. 2 is a photocicrograph of a panel from Example I with ultrasonic power applied at 2.67 Watts/gal. of solution and 0.39 Watts/sq. in. radiating surface at magnification 375X.
Figure 3:
FIG. 3 is the same as FIG. 1 but at magnification 1500X.
Figure 4:
FIG. 4 is the same as FIG. 2 but at magnification 1500X.
Figure 5:
FIG. 5 is the same as FIG. 1 with immersion time of five minutes instead of two minutes.
Figure 6:
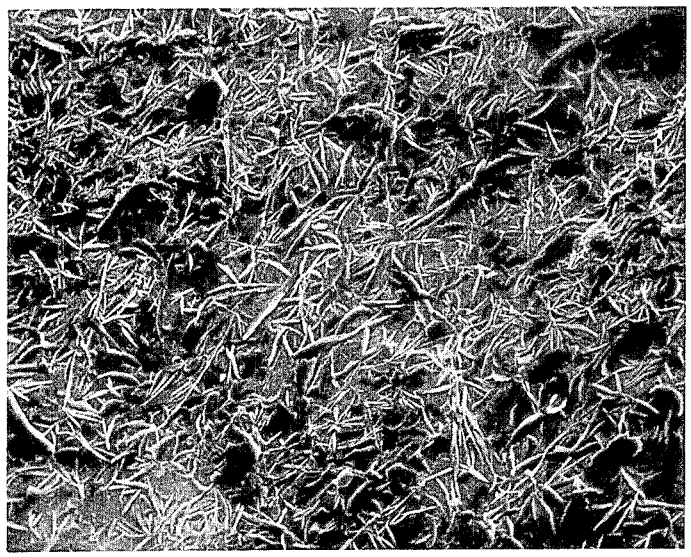
FIG. 6 is the same as FIG. 2 with immersion time of five minutes instead of two minutes.
Figure 7:
FIG. 7 is the same as in FIG. 5 but at magnification 1500X.
Figure 8:
FIG. 8 is the same as FIG. 6 but at magnification 1500X.

The greatly improved results obtained in the practice of the present invention are clearly apparent in the drawings. For instance, in FIG. 1 there are widely scattered relatively large needlelike crystals typical of the irregular nonuniform coatings produced by the prior art immersion processes, whereas in FIG. 2 the crystals formed using the process of the present invention are much finer and more numerous. These differences are further evident in FIGS. 3 and 4 at much higher magnification. Also at the higher magnifications of FIGS. 3 and 4 it is apparent that the metallic surface is completely covered by crystals in FIG. 4 as compared to incomplete coverage in FIG. 3. These differences are also present in FIGS. 5 and 6 where the immersion was for a longer time period (five minutes as compared to two minutes for FIGS. 1 and 2) and are even more apparent at the higher magnifications of FIGS. 7 and 8.

Figure 9:
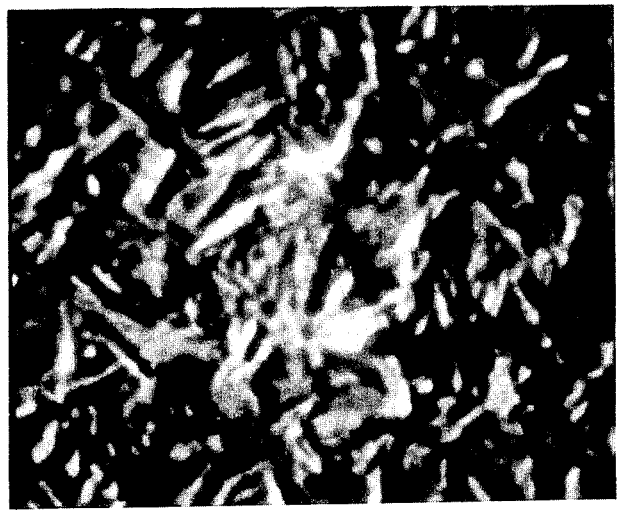
FIG. 9 is a photomicrograph of a panel from Example IV with no ultrasonic power applied at magnification 300X.
Figure 10:
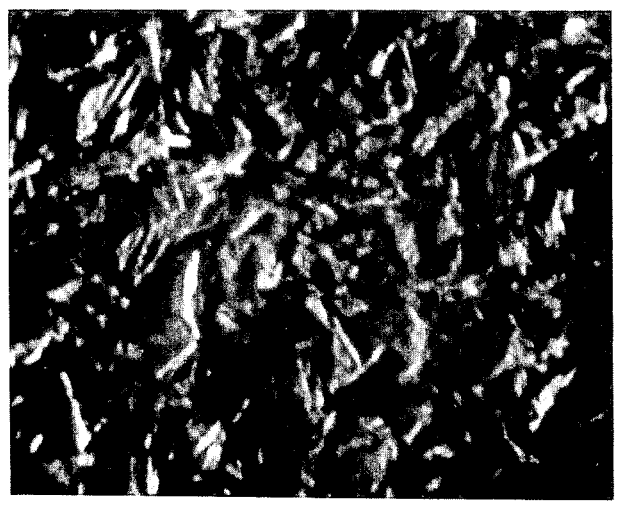
FIG. 10 is a photomicrograph of a panel from Example IV with ultrasonic power applied at 2.67 Watts/gal. of solution and 0.39 Watts/sq. in. radiating surface at magnification 300X.

In FIG. 9, which illustrates the results obtained on galvanized iron in the prior art immersion process, relatively coarse and discontinuous crystals are shown as compared with the smooth, continuous crystal formation shown in FIG. 10 on a galvanized iron panel treated in accordance with the process of the present invention.

In describing the process of the present invention we have referred to specific conversion coating formulations which are particularly adapted to forming coatings which are satisfactory for later applications of siccative coatings such as paint. However, it is important to note that the present invention is not limited to the use of these particular formulations since other zinc phosphate coating formulations may be used to achieve substantially similar improved results for the same purpose. While the precise mechanisms involved in the application of ultrasonic energy to metallic surfaces immersed in zinc phosphate conversion coating baths are not known, it is the application of such ultrasonic energy in controlled ultrasonic power environments which is significant rather than the particular constitution of the zinc phosphate conversion coating baths. Apparently the application of ultrasonic energy within a controlled ultrasonic power environment to a metallic surface immersed in a zinc phosphate conversion bath has an effect on crystal formation which, surprisingly, leads to smooth, uniform coatings rather than the expected irregular, nonuniform coatings.

Figure 11:
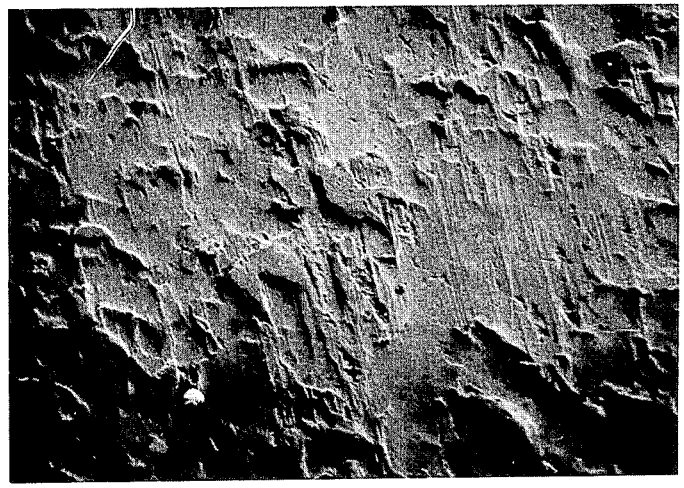
FIG. 11 is a scanning electron photomicrograph of a typical steel surface.
Figure 12:
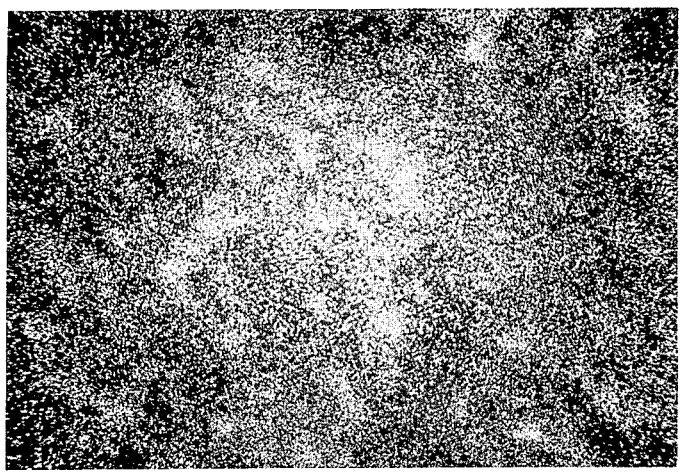
FIG. 12 is a carbon dot map of the steel surface in FIG. 11.

FIG. 11 is a scanning electron micrograph of a typical steel surface. A surface analysis of the steel surface in FIG. 11 is displayed as the carbon dot map of FIG. 12. The lighter areas of the carbon dot map are areas of high carbon concentration. These figures show that what appear to be raised areas on the metal surface in FIG. 11 are actually the areas of high carbon residue which is inherently found on steel surfaces.

Figure 13:
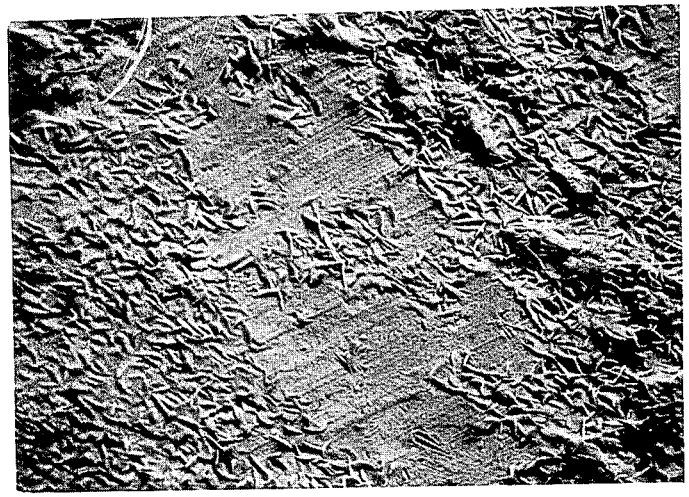
FIG. 13 is a scanning electron photomicrograph of a steel surface coated by a method of the prior art.
Figure 14:
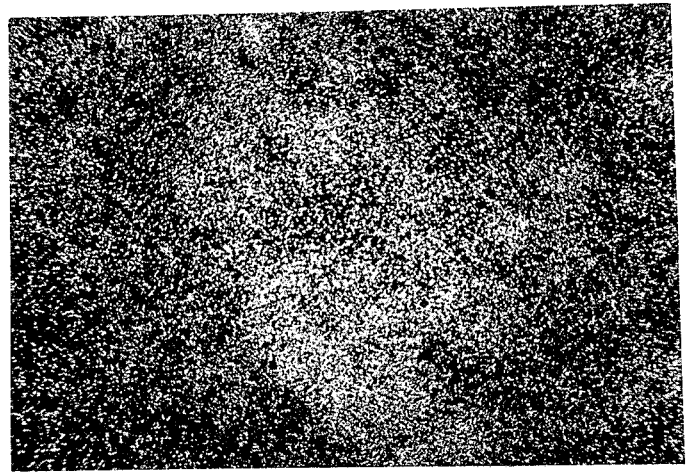
FIG. 14 is a carbon dot map of the steel surface of FIG. 13.
Figure 15:
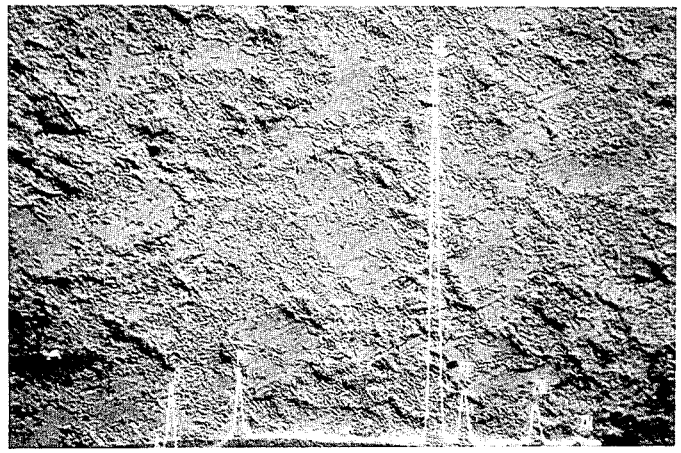
FIG. 15 is an X-Ray spectrographic analysis of the steel surface of FIG. 13.

FIG. 13 is a scanning electron photomicrograph of a steel surface coated by a method of the prior art. The photomicrograph shows an area of steel left uncovered by crystals. A surface analysis of this steel surface presented by the carbon dot map of FIG. 14, shows that the uncoated area of the steel surface in FIG. 13 is an area of carbon residue. A X-ray spectrographics analysis, FIG. 15, shows that the coating on the steel surface shown in FIG. 13 is a poor zinc phosphate coating.

Figure 16:
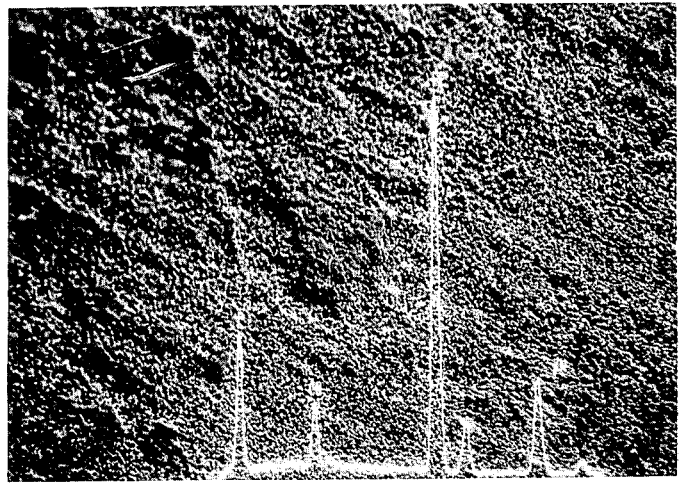
FIG. 16 is a scanning electron photomicrograph superimposed by an X-Ray spectrographic analysis of a steel surface.
Figure 17:
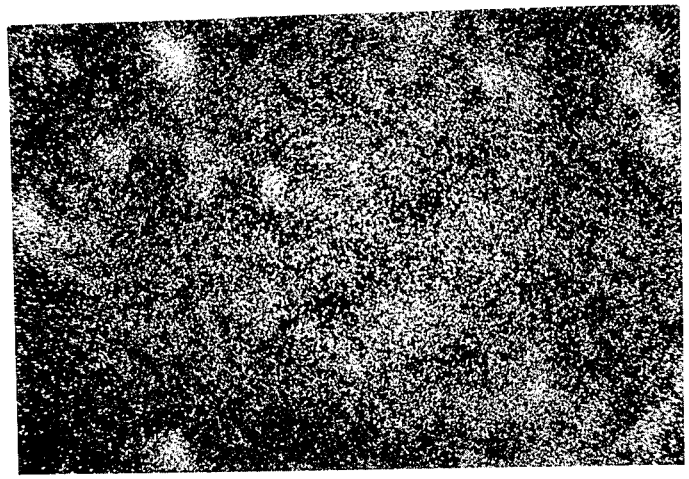
FIG. 17 is a carbon dot map of the steel surface of FIG. 16.

The scanning electron photomicrograph superimposed by an X-Ray spectrographic analysis, FIG. 16, shows a high quality calcium zinc phosphate coating, 210 mg/ft., on a steel surface. A wavelength analysis of the carbon distribution on the steel surface of FIG. 16 is displayed as the carbon dot map, FIG. 17, wherein the lighter areas are areas of high carbon concentration. FIGS. 16 and 17 show that even the areas of high carbon residue concentration on the steel surface of FIGS. 16 and 17 were coated by high quality calcium zinc phosphate crystals.

Figure 18:
FIG. 18 is a scanning electron photomicrograph of a steel surface coated by a method of the present invention.
Figure 19:
FIG. 19 is a zinc dot map of the steel surface of FIG. 18.
Figure 20:
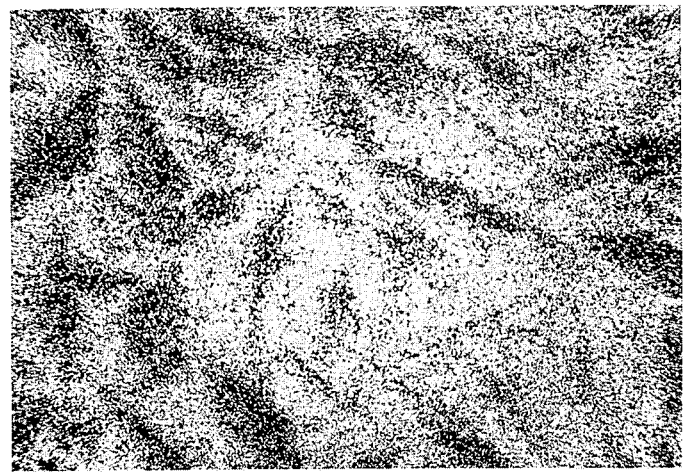
FIG. 20 is an iron dot map of the steel surface of FIG. 18.
Figure 21:
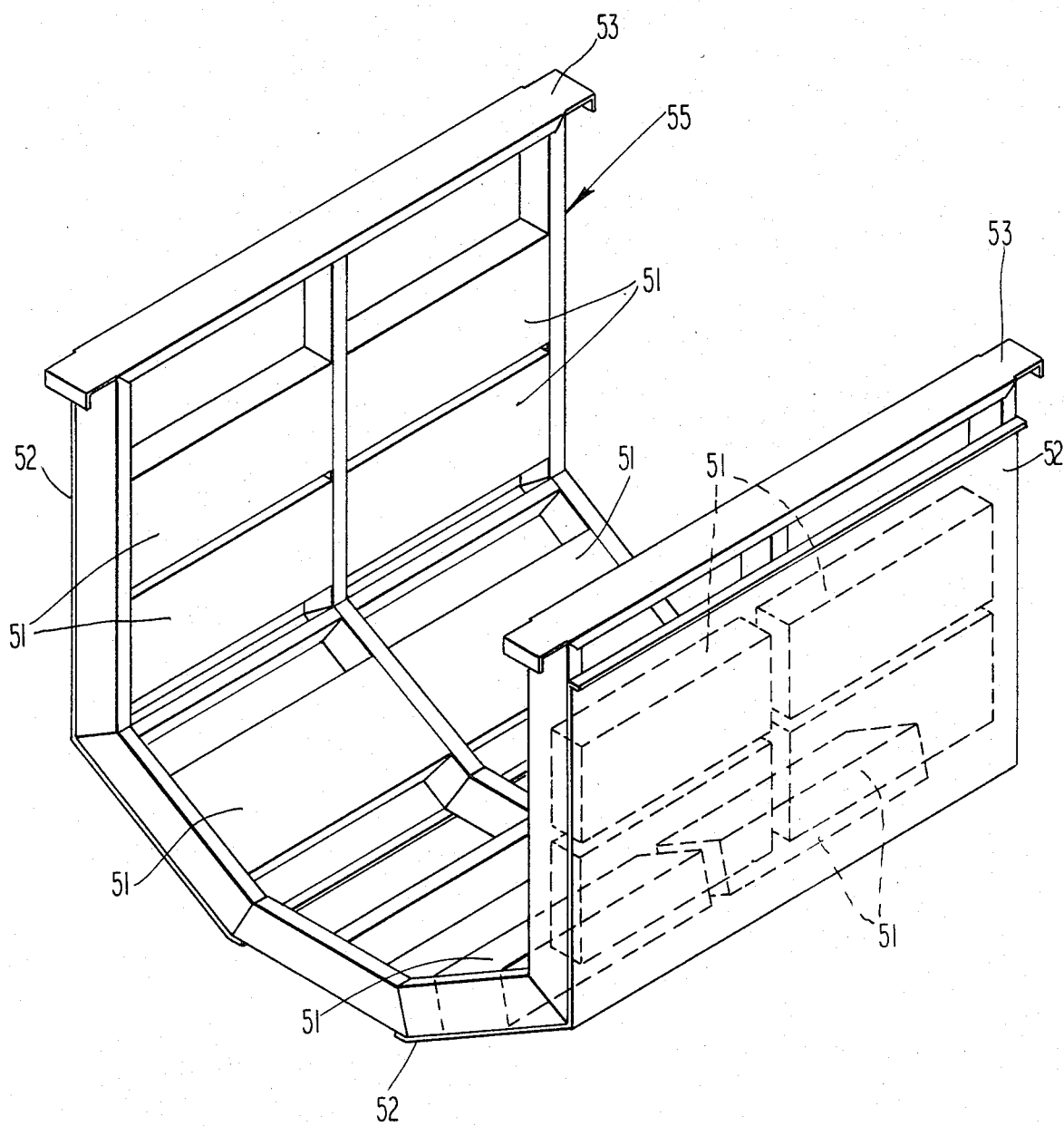
FIG. 21 is a perspective view of a harness containing ultrasonic transducers.
Figure 22:
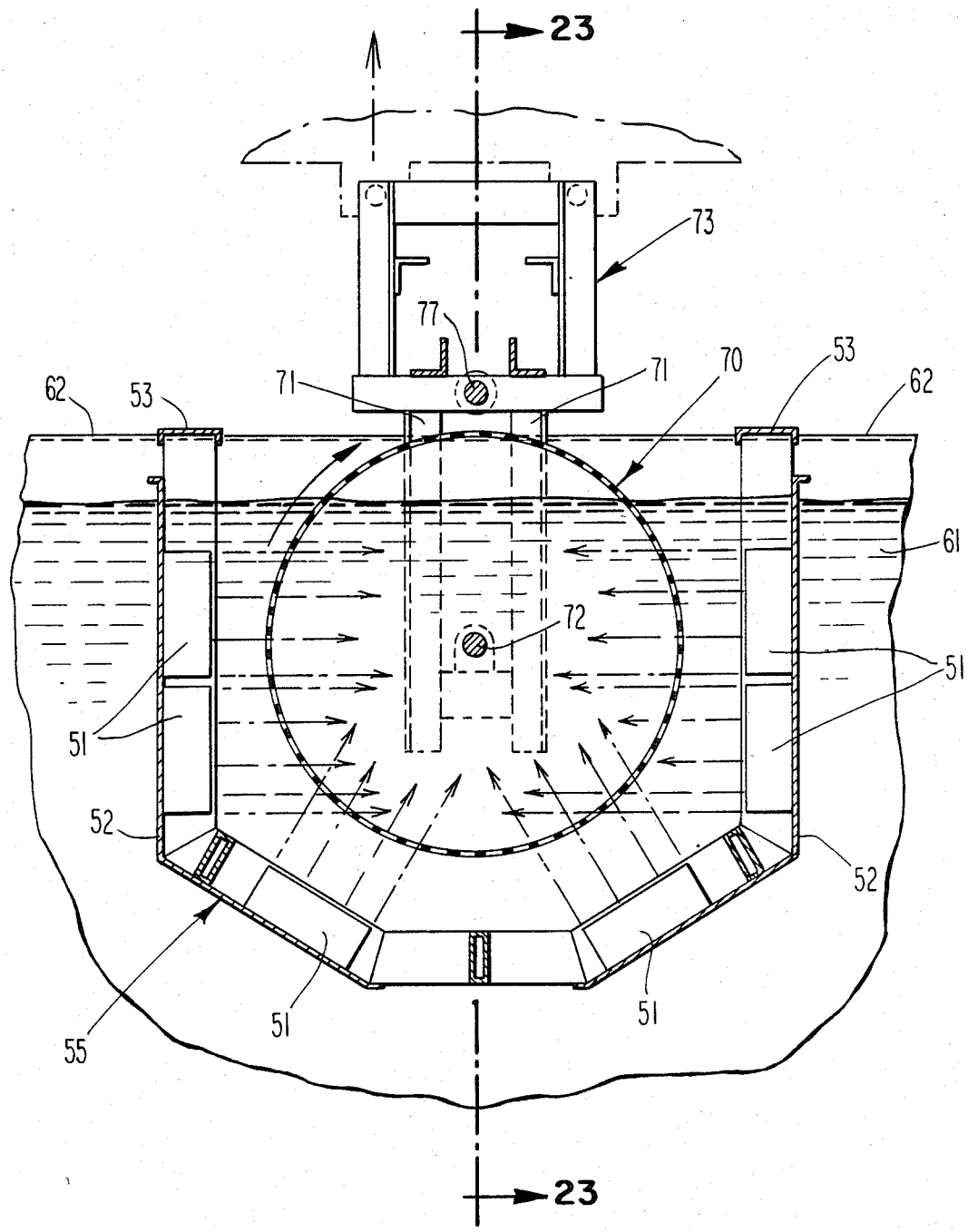
FIG. 22 is a side view of a rotating drum assembly within a harness containing ultrasonic transducers and submerged in a phosphate coating bath.
Figure 23:
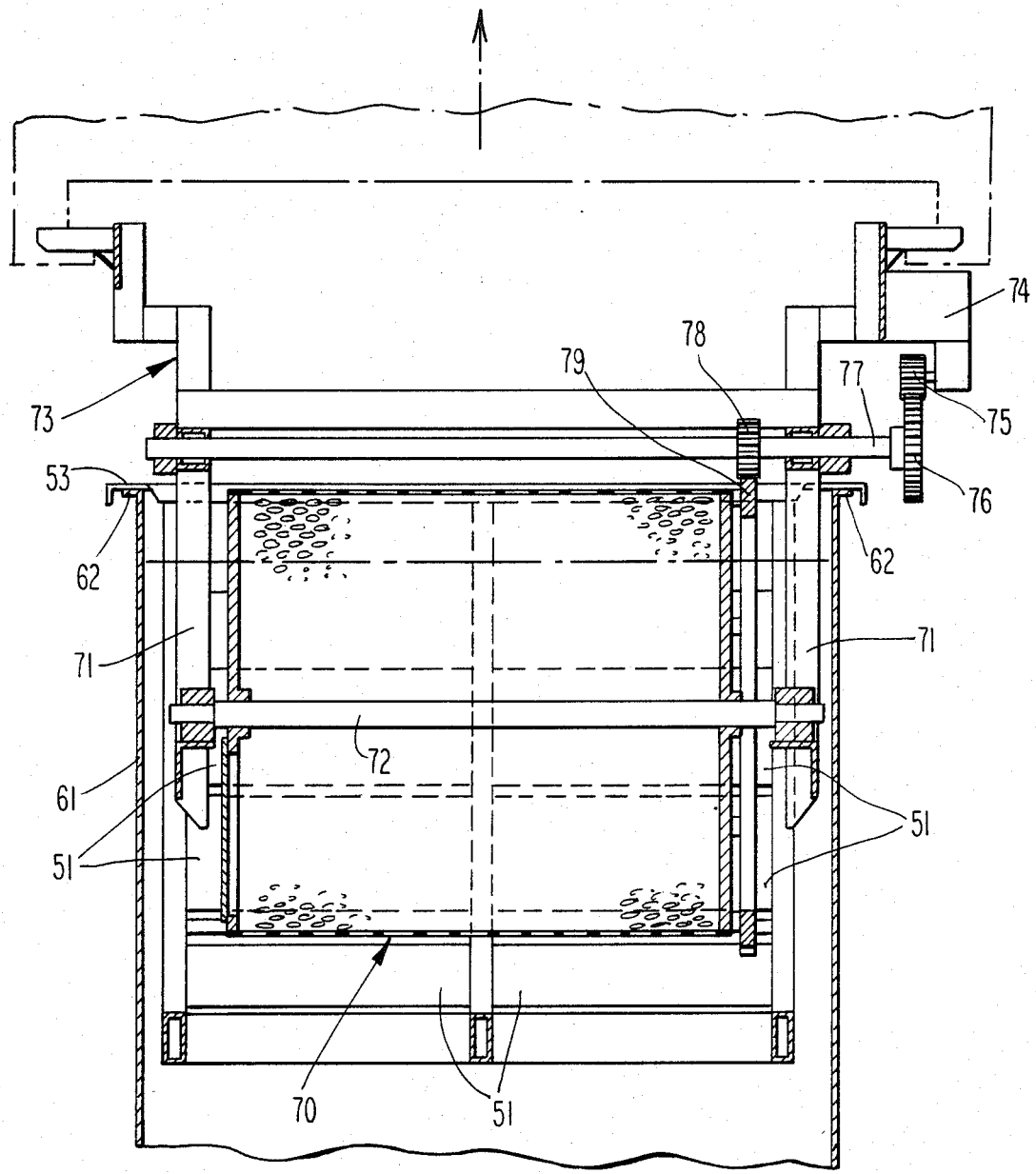
FIG. 23 is a local transverse vertical cross-sectional view taken substantially on the line 23—23 of FIG. 22.

FIG. 18 is a scanning electron photomicrograph of a steel surface coated by a method of the present invention. FIG. 18 bears a high quality coating. FIGS. 19 and 20 are surface analyses of the surface shown in FIG. 18. FIG. 19 is a zinc dot map which shows the areas of high zinc concentration. The lighter areas of FIG. 19 are areas of higher zinc concentration. FIG. 20 is an iron dot map of the surface shown in FIG. 18. The lighter areas of FIG. 20 are areas of higher iron concentration. FIGS. 18, 19 and 20 show that problem steel, i.e. steel which inherently contains areas of high carbon residue concentration, may be coated by a process of the present invention with a phosphophyllite solution, FeZn(PO$_4$), to give a high quality generally uniform coating. FIGS. 16 and 17 showed the uniform coating could be achieved by a method of this invention utilizing a scholzite solution containing calcium zinc phosphate, CaZn(PO$_4$).

Having described our invention by reference to preferred and best known mode examples, we claim:

1. A process for forming improved zinc phosphate conversion coatings on metallic surfaces comprising the steps of: immersing the metallic surface to be coated in a zinc phosphate conversion coating bath; exposing the immersed metallic surface to ultrasonic energy during at least part of the conversion coating process, said ultrasonic energy produced by means of at least one ultrasonic transducer submerged within the zinc phosphate coating bath wherein the intensity of the ultrasonic energy impinging onto said metallic surface is within the range of from about 0.11 W/sq. in. to 1.27 W/sq. in.

2. The process of claim 1 wherein said ultrasonic transducer produces varying zones of energy intensities within said conversion bath; and varying the position of said immersed metallic surface and said ultrasonic transducer relative to each other wherein said immersed metallic surface effectively passes through said varying zones of energy intensities whereby a fine-grained, uniform, unstraited coating is produced on said immersed metallic surface.

3. The process of claim 2 in which the positions of said immersed metallic surface and said ultrasonic transducers relative to each other are selected from the group consisting of (1) varying the positions by moving said immersed metallic surface through said varying zones of energy while said ultrasonic transducer is maintained in a stationary position, (2) varying the positions by maintaining said immersed metallic surface in a stationary position and moving said ultrasonic transducer such that said immersed metallic surface effectively passes through said zones of varying energy intensities, and (3) combinations thereof.

4. The process of claim 3 wherein the relative movement through said varying zones of energy intensities is curvilinear.

5. The process of claim 4 wherein said curvilinear movement is selected from the group consisting of rotating movement, revolving movement, sinusoidal movement, oscillating movement, any portion thereof, or any combination thereof.

6. The process of claim 5 wherein the axis of said movement is selected from the group of horizontal, vertical, or any combination thereof.

7. The process of claim 4, wherein said curvilinear movement is selected from the group consisting of tumbling, twisting, turning, oscillating, or any combination thereof.

8. The process of claim 4, wherein said curvilinear movement comprises relative movement toward or away from a plane containing the radiating surface of at least one of said ultrasonic transducers during exposure of said metallic surface to said ultrasonic energy.

9. The process of claim 1 in which the improved zinc phosphate conversion coatings are formed on said metallic surface by exposing said zinc phosphate conversion coating bath to ultrasonic energy for a limited time and then immersing metallic surface in said conversion coating bath for a further limited time while the conversion coating reaction proceeds.

10. The process of claims 1, 3 or 9, wherein the intensity of the ultrasonic energy impinging onto said metallic surface is within the range of from about 0.20 W/sq. in. in to 0.65 W/sq. in.

11. The process of claim 10 wherein the frequency of said ultrasonic energy is from about 18 to 60 kilohertz.

12. The process of claim 11 wherein the frequency of the ultrasonic energy is about 26.5 kilohertz.

* * * * *